(12) United States Patent
Chen et al.

(10) Patent No.: US 10,460,112 B2
(45) Date of Patent: Oct. 29, 2019

(54) SYSTEM AND METHOD FOR PRIVACY LEAKAGE DETECTION AND PREVENTION SYSTEM WITHOUT OPERATING SYSTEM MODIFICATION

(71) Applicant: NORTHWESTERN UNIVERSITY, Evanston, IL (US)

(72) Inventors: Yan Chen, Northfield, IL (US); Vaibhav Rastogi, Evanston, IL (US); Zhengyang Qu, Evanston, IL (US); Jedidiah McClurg, Longmont, CO (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 14/615,254

(22) Filed: Feb. 5, 2015

(65) Prior Publication Data

US 2015/0227746 A1 Aug. 13, 2015

Related U.S. Application Data

(60) Provisional application No. 61/936,934, filed on Feb. 7, 2014.

(51) Int. Cl.
*H01L 29/06* (2006.01)
*G06F 21/57* (2013.01)

(52) U.S. Cl.
CPC ...... *G06F 21/577* (2013.01); *G06F 2221/033* (2013.01); *G06F 2221/034* (2013.01)

(58) Field of Classification Search
CPC ...... H04L 43/00; G06F 21/00; G11C 7/10009
See application file for complete search history.

(56) References Cited

U.S. PATENT DOCUMENTS

| 8,201,026 | B1 * | 6/2012 | Bornstein | G06F 9/45508 714/45 |
| 8,726,392 | B1 * | 5/2014 | McCorkendale | G06F 21/56 713/188 |
| 9,104,528 | B2 * | 8/2015 | Xiao | G06F 21/00 |
| 9,443,085 | B2 * | 9/2016 | Glew | G06F 21/577 |
| 9,672,355 | B2 * | 6/2017 | Titonis | G06F 21/56 |
| 2011/0145918 | A1 * | 6/2011 | Jung | G06F 21/52 726/22 |

OTHER PUBLICATIONS

Zhemin Yang, Min Yang, Yuan Zhang, Guofei Gu, Peng Ning, and X Sean Wang. Appintent: Analyzing sensitive data transmission in android for privacy leakage detection. In Proceedings of the 2013 ACM SIGSAC conference on Computer & communications security, pp. 1043-1054. ACM, 2013.

(Continued)

*Primary Examiner* — Edward Zee
*Assistant Examiner* — Leynna T Truvan
(74) *Attorney, Agent, or Firm* — Benesch, Friedlander, Coplan & Aronoff LLP

(57) ABSTRACT

A system and method detect privacy leaks in applications of an operating system of a mobile device. An instrumentation module permits tracking of privacy-sensitive information without modification of a middleware of the operating system and a process virtual machine.

12 Claims, 5 Drawing Sheets

(56) References Cited

OTHER PUBLICATIONS

V. Rastogi, Y. Chen, and W. Enck. AppsPlayground: Automatic Security Analysis of Smartphone Applications. In Proceedings of ACM CODASPY, 2013.
W. Enck, D. Octeau, P. McDaniel, and S. Chaudhuri. A study of android application security. In USENIX Security, 2011.
W. Enck, P. Gilbert, B.G. Chun, L.P. Cox, J. Jung, P. McDaniel, and A.N. Sheth. Taintdroid: An information-flow tracking system for realtime privacy monitoring on smartphones. In Proceedings of the 9th USENIX conference on Operating systems design and implementation, pp. 1-6. USENIX Association, 2010.
C. Gibler, J. Crussell, J. Erickson, and H. Chen. Androidleaks: Automatically detecting potential privacy leaks in Android applications on a large scale. Trust and Trustworthy Computing, 2012.

\* cited by examiner

SYSTEM AND METHOD FOR PRIVACY LEAKAGE DETECTION AND PREVENTION SYSTEM WITHOUT OPERATING SYSTEM MODIFICATION

CROSS-REFERENCE TO RELATED APPLICATION

This application claims priority benefit from U.S. Provisional Application Ser. No. 61/936,934, which was filed on Feb. 7, 2014, which is incorporated by reference in its entirety.

BACKGROUND

Mobile computing is becoming increasingly popular with the advent of smartphones and tablets. Third party applications can play an important role in the mobile computing ecosystem by providing enriched functionality and enhanced user experience. Unfortunately, some of these applications may be malicious or may not operate according to users' expectations.

DESCRIPTION

Mobile devices are becoming increasingly popular. One reason for their popularity is the availability of a wide range of third-party applications, which enrich the environment and increase usability. There are, however, privacy concerns centered around these applications. For example, users do not know what private data is leaked by the applications. Previous works to detect privacy leakages are not accurate enough due to various reasons or require operating system changes, which may not be possible due to users' lack of skills or locked devices.

A system and method (hereinafter system) can instrument Android applications to detect privacy leakages, e.g., in real-time. The system need not require any platform modification nor does it need the application source code. The system can include static analysis to instrument only paths along which privacy leakage may happen. The system can employ several mechanisms to overcome challenges introduced by framework code, callback functions, and so on.

The system for detection of privacy leaks can include one or more of the following. Situationally-aware prevention: the situation or condition under which a leak happens. A privacy leak may be intended and in that case legitimate. For example, upload of pictures to a social network under a user's consent is legitimate. If a leak is not legitimate, the system can prevent it upon a device prompt. Real-time detection enables situationally-aware decision making. Offline detection of leaks may be helpful but does not usually identify the complete situation under which a leak happens. No system modification: the system is usable, which includes easy installation of the system. Mobile devices typically come locked and it is beyond an average user to root or unlock the devices to install a custom firmware. Easily configurable: the device is able to enable the privacy leak detection just for the applications she is concerned about. Other parts of the device run without overhead. Accuracy: the detection can be accurate with few false positives or negatives. Good performance: the detection of privacy leaks has acceptable performance overhead. Portability: the same framework is able to detect privacy leaks across different devices with potentially different architectures (e.g., ARM, MIPS, and x86) with little code modification.

Figure 1A:
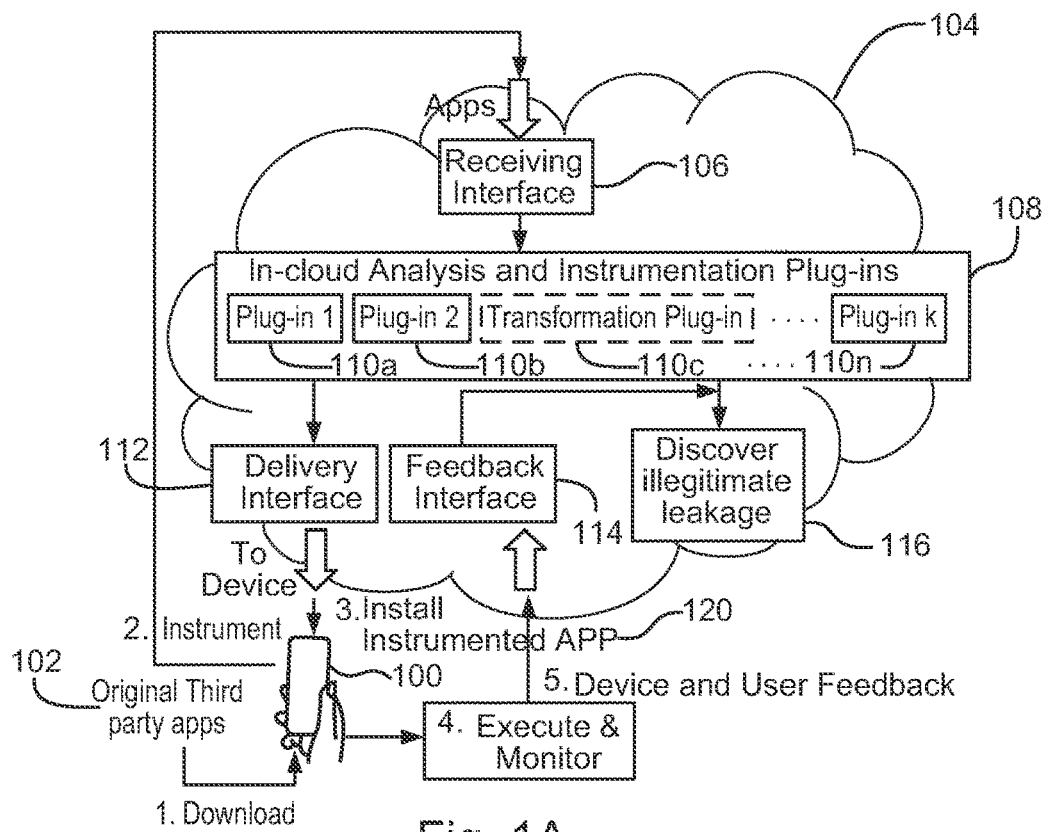
FIGS. 1A and 1B are block diagrams of exemplary device information leakage detection and prevention systems.
Figure 1B:
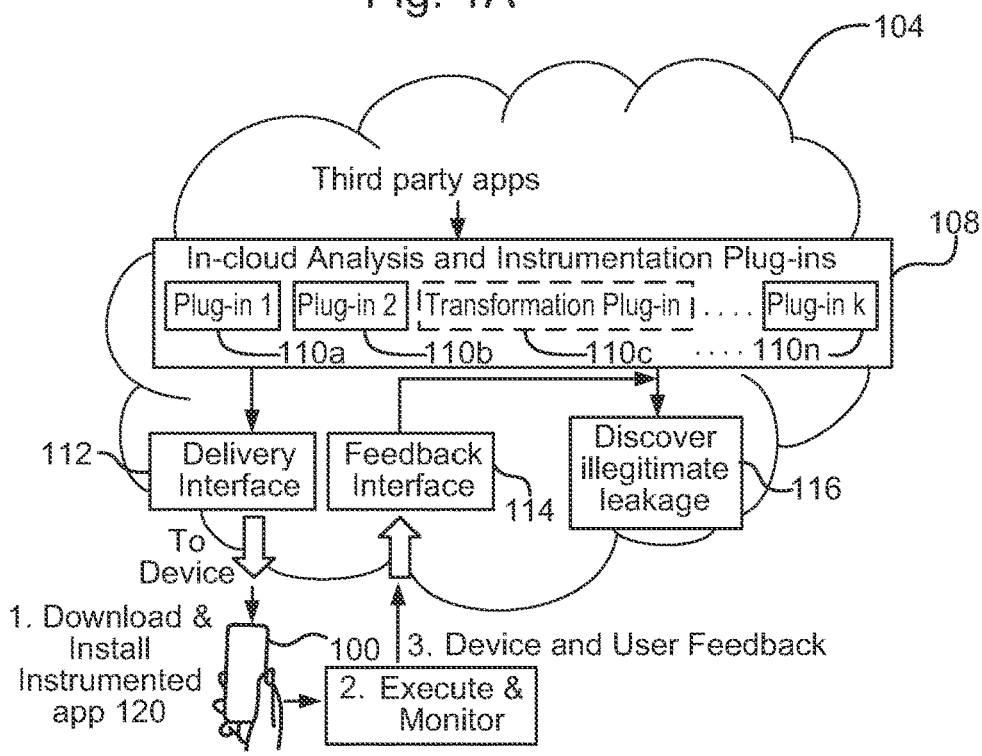

FIGS. 1A and 1B are block diagrams of exemplary device information leakage detection and prevention systems 104, without operating system modification. FIG. 1A illustrates an example deployment of an un-instrumented application 102 to the device 100 directly by a vendor or third party, and FIG. 1B illustrates an example deployment of an instrumented application 120 through a market. A device 100 can include a mobile phone, a personal digital assistant (PDA), a tablet, a computer, etc. In FIG. 1A, the environment functions independently of the source of applications 102. It is suitable for enterprises, third-party subscription services, individual users, and smartphone vendors and carriers. As the device 100 downloads the third-party application 102 (1), the downloaded application is passed to a system 104 for analysis and instrumentation (2). The system 104 can include a receiving interface 106 and analysis and instrumentation module 108. The analysis and instrumentation module 108 can include plug-in applications 110a-n. e.g., a transformation plug-in module 110c. The system 104 can reside in the cloud as a service supported by the vendor or the third-party. It is also possible to place this service on personal computers or enterprise's servers, etc.

Once the application 102 has been analyzed and instrumented by the system 104, an instrumented application 120 can be installed on the device 100, e.g., via a delivery interface 112 (3). The instrumented application 120 can then monitor the device 100 as it runs, e.g., continuously, periodically, etc. The instrumented application 120 can pass some of the important monitoring information and device feedback to the system 104 for further analysis to aid the discovery of malware, vulnerabilities, privacy data leakage (4). The monitoring information can be sent to the system 104 via a feedback interface 114 to detect illegitimate leakage 116. Leakage information may be fed back to the device 100, e.g., via the delivery interface 112. The process may be completely automated with the use of an on-device application so the device 100 needs to only confirm the removal of the original application 102 and installation of the instrumented application 120. A user of the device may confirm the removal via an interface of the device. Additionally or alternatively, the device 100 may be provided with preset policies, concerning the different sources and sinks, etc.

The system 104 is described for detecting privacy leaks in mobile operating system applications without platform modification. For purposes of explanation, the system 104 is described in terms of the Android operating system, but the system 104 may be used with other operating systems. Android is an operating system for mobile devices such as smartphones and tablets. It is based on the Linux kernel and implements middleware for telephony, application management, window management, and so on. Applications can be written in Java and compiled to Dalvik bytecode, which can run on Android. The bytecode and virtual machine mostly comply with the Java Virtual Machine Specification.

Each application in Android runs in a sandbox isolated from other application sandboxes. Android enforces a permission-based security model for applications. Applications declare permissions for accessing sensitive APIs (Application Programming Interfaces) and components of other applications. These permissions are approved at install-time. Permissions give a direct indication to the user what the application can access. However, they can be insufficient in telling whether the access really happens at runtime and if the application leaks any privacy-sensitive data to outside the device. Privacy leakage detection is usually formulated as an information-flow-tracking problem. APIs providing sensitive data such as the device identifiers and location are marked as sources. APIs that send information out to the network, for example, may be marked as sinks. Any data coming out from the sources is marked as tainted. Different instructions propagate the taint according to a taint propagation policy. For example, the addition instruction may propagate taint from the operands to the result. If any tainted data reaches a sink, it signifies leak of private data. Tracking information flow may be accomplished through both dynamic analysis and static analysis.

Detection of privacy leaks involving tracking information can flow real-time at runtime. Whereas other real-time systems may modify the Android, or other operating system, middleware, including the Dalvik virtual machine, to enable tracking of privacy sensitive information through the code, the system 104 can instrument the applications themselves to detect access of, track through the application code, and alert possible leak of private data. The device 100 can install the instrumented applications 120 to detect privacy leaks without the need to install a custom firmware on the device 100. This can also bring the added benefit of instrumenting just the applications that the device 100 is concerned about; the rest of the system, including the middleware and other applications, run without overhead. Since the system does not touch the Android middleware and the Dalvik runtime, the approach can ensure portability.

In FIG. 1B, the application is being distributed through a controlled market or application store, instead of directly from a third party, therefore it can be instrumented before sending it to the device 100. The deployment model is suitable for application markets, which want to instrument all applications with some general security policies to protect the consumers. In this case, the applications 102 are instrumented in the cloud before the device 100 downloads and installs the application 120. Thus, there is no need for the original application 102 to be uploaded from the device 100 to the system 104 for instrumentation. Furthermore, the applications 120 may be kept pre-instrumented so that they may be downloaded right away, without waiting for the time it takes to instrument applications. The application update system at Google Play (and possibly other Android markets) currently depends on applications' signatures. In the first deployment model, third party services can therefore provide out-of-band mechanisms to notify users of available updates. For the second deployment model, since everything is handled by the markets or application stores, the update process can be seamless.

Previous systems have used application instrumentation to interpose on system calls or application programming interfaces (APIs) without making any platform modification. In the system 104, information flow tracking for privacy leaks can include instrumenting many different instructions (not just the instruction that result in API calls). Implementing information-flow tracking at the platform level typically involves modifying the hardware or a virtual machine to propagate data about the flows (e.g., the data called taints). This can affect all instructions executing on that platform. Instrumentation at just the application-level, however, brings in other considerations as well. Since the system cannot instrument API code (that would modify the platform), the system approximates flow through the API code and for callbacks, e.g., the application code called by the API code. For complex languages such as Java, the system track taints of different memory regions within the language itself. This can be non-trivial because of the constraints enforced in the language's runtime.

Figure 2:
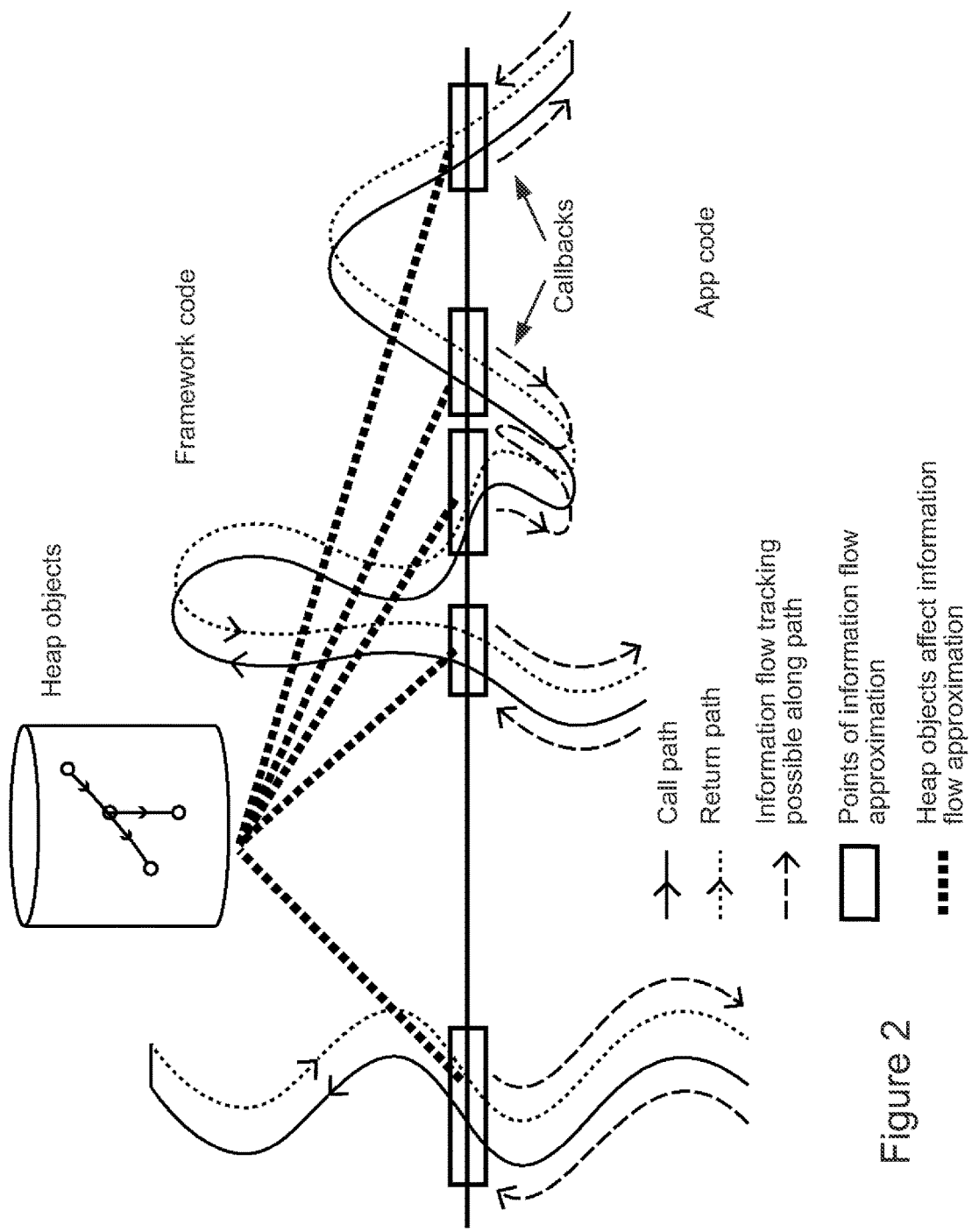
FIG. 2 is a diagram of example propagation challenges that the system 104 can handle.

FIG. 2 is a diagram of example propagation challenges that the system 104 can handle. There are paths between application code and framework code depicted as meandering function call paths and return paths, together with callbacks (the application code that is called by framework code). The left path results from ordinary calls while the right path includes callbacks. Information flow tracking is done for application code, requiring approximations form framework code. Callbacks are handled soundly. Objects on the heap point to each other and their effect on information flow are accounted for during approximations.

Calls into the framework: challenge C1—Framework code cannot be modified, cannot instrument framework code. Summarize the effect of framework APIs according to a custom policy, combined with manual summarization for a few special cases. Previous works on static or dynamic binary instrumentation have only needed to summarize system calls or very simple functions in low-level libraries like libc, which are much simpler. Static analysis works also use summarization to achieve scalability. In the context of dynamic analysis and complex framework with Java data structure in Android, summarization alone may not be sufficient. Heap objects can be particularly challenging to handle and the system 104 can use additional techniques for effective taint propagation, as described below in FIG. 3.

Handling callbacks: Challenge C2—the effect of callbacks accounted for. Callbacks are functions in application code that may be invoked by the framework code. Since framework code cannot be instrumented, the system 104 cannot do taint propagation when callbacks are invoked. The system 104 can use over-tainting to avoid false negatives.

Figure 3:
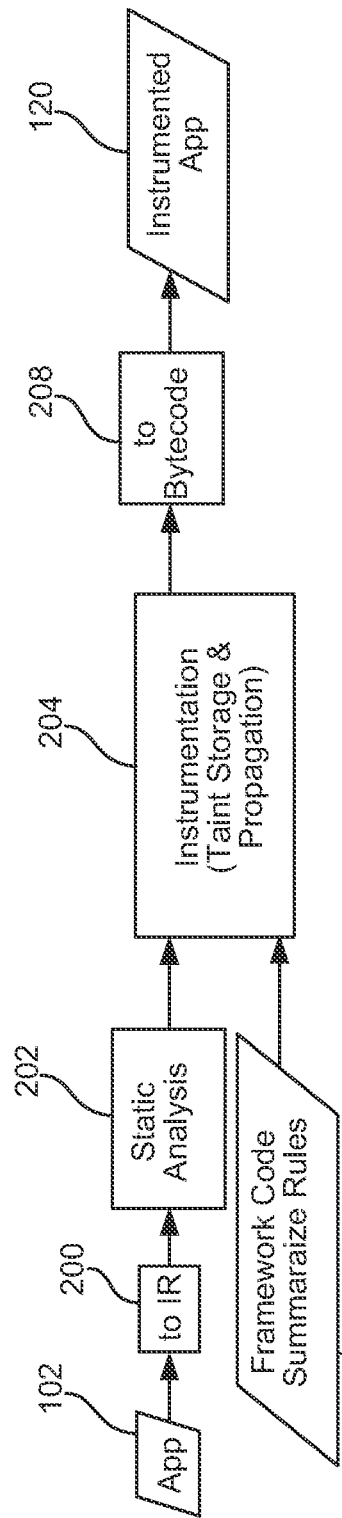
FIG. 3 is a block diagram of an exemplary instrumentation flow in the system.

FIG. 3 is a block diagram of an exemplary instrumentation flow in the system 104. The system 104 provides a general framework for instrumenting applications statically and for providing information flow tracking, which may be used in a number of applications, including hardening applications and malware detection. The functionalities of the system 104 is applied to track privacy leakages. FIG. 3 depicts the architecture of the system for privacy leakage tracking. When an application 102 is sent to the system, the application code is converted to an intermediate representation (IR) (200) that is suited to both static program analysis and subsequent instrumentation, e.g., as described below. The system 104 performs a static analysis on the IR to converge on possible code paths that may leak private information (202). After static analysis, the system instruments those code paths so that taint propagation may happen at runtime (204). Since the framework code cannot be instrumented, it approximates the effects of framework code through automatic and manual summarization rules (206).

The taint storage and propagation can influence the accuracy and runtime performance of privacy leakage detection.

The techniques focus on providing privacy leakage detection without false negatives under the constraints of not modifying the platform. Each entity that may be tainted is associated with a taint tag, which identifies what kind of private information may be carried by the entity. In the system 104, taints are stored and propagated for local variables (e.g., method registers), fields, method parameters and returns, and objects. Different bytecode instructions handle different storage types (e.g., local variables, fields and so on) and accordingly have different taint propagation rules. Additionally, IPC (inter-process communication) taints and file taints are handled at a coarser granularity. For IPC, the entire message carries the same taint. Similarly, an entire file can be assigned a single taint tag. In the design, tracking IPC and file taints includes communication with an on-phone the system application, which keeps track of all file taints and IPC taints from instrumented applications.

Next is described the taint propagation rules for the different situations. The discussion first assumes that all the code can be instrumented (including the framework) and then introduce changes to leave the framework code intact.

Method-local registers. For each register that may possibly be tainted, the system 104 introduces a shadow register that stores the taint for this register. Any move operations simply also move the shadow registers. The same also happens for unary operations while for binary operations, the system combines the taints of the operands and assign to the shadow register of the result. Instructions assigning constants or new object instances zero the taint of the registers.

Heap objects. Heap objects include class objects, containing fields, and arrays. For each field that may possibly be tainted, an additional shadow taint field is inserted in the corresponding class. The load and store instructions for instance fields and static fields are instrumented to assign to or load from these taint fields to the local registers. Additional fields may not be inserted into framework classes. In this case the system taints the entire object.

In the case of arrays, each array is associated with only a single taint tag. If anything tainted is inserted into an array, the entire array becomes tainted. This policy is used for efficiency reasons. The system also supports index-based tainting so that if there is an array-get (e.g., a load operation) with a tainted index, the retrieved value is tainted.

Method parameters and returns. Methods may be called with tainted parameters. In this case, the system 104 passes on the tainted information from the caller to the callee. The system 104 takes a straightforward approach to achieve this; for each method parameter that may be tainted, the system 104 adds an additional shadow parameter that carries the taint of the parameter. These shadow parameters may then convey the tainted information to the local registers. Method returns can be trickier. Since the system can return only one value, the system instead introduces an additional parameter to carry the taint of the return value. In Java, there is a call-by-value semantics only so that making assignments to the parameter inside the callee cannot be visible to the caller. The system therefore passes an object as the parameter, which is intended to wrap the return taint. The caller can then use this object to see the return taint set by the callee.

I-arm-droid, Aurasium, and RetroSkeleton use rewriting techniques to interpose on system calls and Android framework APIs. Such interposition can lead to design of security policies such as preventing an application from accessing sensitive information or preventing it from sending short messages. Tracking information flow is however very different and as the system 104 takes into account the effect of the entire application and framework code rather than just interface between the application and the framework. Rather than interposing on method calls alone, the system tracks and accounts for the effects of the code within methods.

With regard to challenge C1, whereas the application code may be instrumented for taint propagation, the system 104 may only approximate the effects of calls into the framework code on taint propagation. The system uses a worst case taint policy to propagate taints in this case:

Static methods. For static methods with void return, the system combines the taints of all the parameters and assign this to all the parameter taints. For static methods with non-void returns, the taints of all the parameters are combined and assigned to the taint of the register holding the return value.

Non-static methods. Non-static methods often modify the receiver object (the object on which the method is invoked) in some way. Therefore, the system combines the taints of all the non-receiver parameters; apart from its original taint, the receiver object is now additionally tainted with this combined taint. In case the method returns a value, the return taint is defined as the receiver taint.

Note that these rules are not enough to summarize the effects of framework code. Non-static methods often have arguments that are stored into some field of the receiver. Considering:

List list=new ArrayList( );
StringBuffer sb=new StringBuffer( );
list.add(sb);
sb.append(taintedString);
String ret=list.toString( );

In this case, sb and list are untainted until sb.append (taintedString). Thereafter, sb is tainted and so is ret because it includes the contents of taintedString. In general, when an object becomes tainted, any objects containing that can also become tainted. For every object o1 that may be contained in another object o2, the system 104 maintains a set of the containing objects. If the taint of o1 ever changes, the system 104 propagates this taint to all the containing objects. The set of containing objects is updated whenever there is a framework method call o2.meth( . . . , o1, . . . ), where meth is a method on o2 and possibly belongs to the framework code. This is a worst case solution; in certain cases, such a method would not lead o1 to be contained in o2. The update operation may be recursive, so that an update to taint of o2 may lead to updating the taint of the objects containing o2, and so on. Objects may point to (contain) each other and hence there may be cycles; the update operation however achieves a fixed point at some point and then terminate.

Some classes in the framework, most notably String, are immutable. Taint propagation rules may be simplified for these to take the immutability into account.

A similar technique can also be applied when objects are stored in arrays. As an example, the list in the above example can be replaced by an array and sb stored in that array. Then use Arrays.toString( ) to get a string representation of the array.

Using over-tainting such as the one above may lead to false positives. However, in practice, such techniques work accurately and do not incur any false positives.

With regard to challenge C2, callback is a piece of code that is passed onto another code to be executed later on. In Java, these are represented as methods of objects that are passed as arguments to some code, and the code may later invoke methods on that object. These objects can implement an interface (or extend a known class) so that code is aware which methods are available on the object. Android makes an extensive use of callbacks, which often serve as entry points to the application. Examples of such callbacks are Activity.onCreate( ) and View.onClick( ) when overridden by subclasses. Apart from these, callbacks may be found at other places as well. For example, toString( ) and equals( ) methods on objects are callbacks. Identifying callback methods correctly may be done using class hierarchy analysis, which is part of the static analysis.

Since callback methods override methods in the framework code, their method signatures may not be changed to accommodate shadow taint parameters and returns, lest the overriding relationships are disturbed. For example, consider the following class.

```
class DeviceIdKeeper {
    private String id;
    public DeviceIdKeeper(TelephonyManager m) {
        id = m.getDeviceId( );
    }
    public toString( ) { return id; }
}
```

The application code may call toString( ) on a DeviceIdKeeper instance. Since the return may not be instrumented to propagate taint, the system may lose the taint. Furthermore, it is also possible that this method is called at some point by the framework code. In order to not lose taint, the system 104 lifts the return taints of all callback methods to the receiver objects. That is, in the instrumented callback method, the return taint is propagated to the receiver object taint. In case a possible callback method is called by application code with tainted parameters, the system 104 taints the receiver object with the taint of the parameters and then inside the method definition taint the parameter registers with the taint of the receiver. Since heap objects can carry taints in the model, such over-tainting needs to be done only in case of parameters of primitive types. With the parameter and return tainting in place, the system 104 may use the techniques described for calls into the framework to summarize the effect of this call. This approach takes care of both cases, when the callback is called by an application method, and when it is called by the framework.

Figure 4:
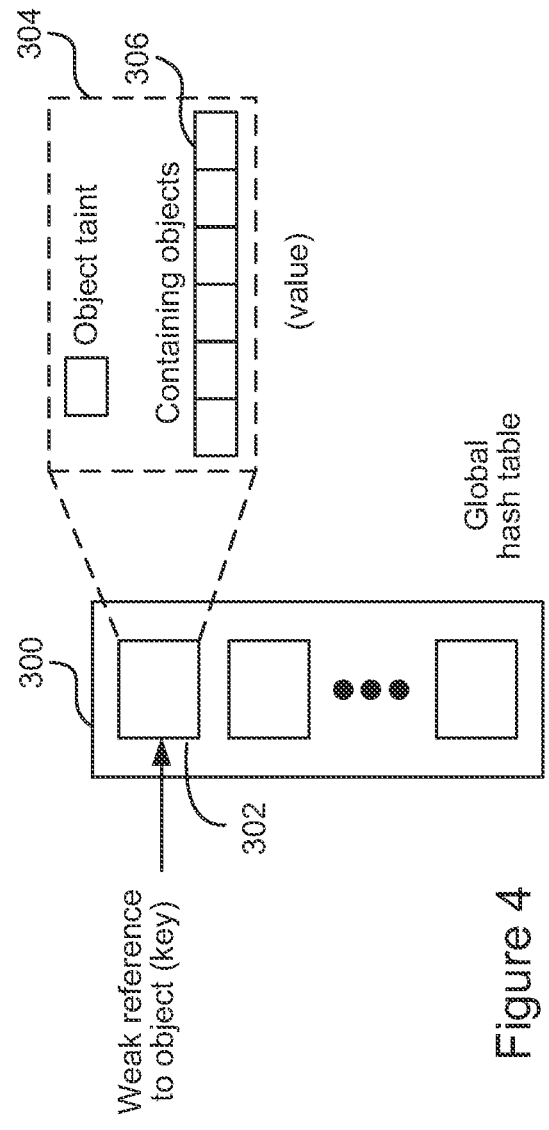
FIG. 4 is a block diagram of an example global hashtable.

FIG. 4 is a block diagram of an example global hashtable 300. From the above, the system 104 needs a way to taint objects. Java uses reference semantics to address objects. Object variables are pointers to object values on the heap and assignment for objects is only a pointer copy. Thus, the system 104 may have two types of tainting, either tainting the pointer, or tainting the object. Storing pointer taints has been discussed as storing taints for method-locals and fields. In addition, the system also associates a set of containing objects with each object.

Taint data-structures. Challenge C3—In the Java language model, objects follow reference semantics and so the system needs a way to taint the locations referenced. Furthermore, objects are deallocated automatically by garbage collection; so the system 104 taint-tracking data structures does not interfere with garbage collection.

The system 104 can use a global hashtable 300, in which the keys 302 are objects and the values are records containing their taints 304 and the set of containing objects 306. Any time, the taints 304 or containing objects 306 needs to be accessed or updated, the system 104 can access these records through the hashtable 300. The hashtable 300 can use weak references for keys to prevent interference with garbage collection. In Java, heap memory management is automatic; so the system 104 cannot know when an object gets garbage-collected. Weak references are references that do not prevent collection of objects and so are ideally suited for keeping objects in hashtable 300. Further, these data-structures can allow concurrent access as the instrumented application may have multiple threads running simultaneously.

With every object, the system 104 can keep a shadow record, which is an object that stores the object taint and the set of containing objects in its fields. The instrumentation may then move this shadow record together with the main object through method-local moves, function calls and returns and heap loads and stores. This technique may not work well with the way the system 104 handles calls into the framework. Consider the following code fragment.

```
// list is a List
// obj is an object
list.add(obj);
obj2 = list.get(0);
```

In the above code, obj and obj2 could be the same objects. However, since the loads/stores and moves inside the List methods are not visible to us, the system 104 cannot track the shadow record of obj there. The shadow record of obj2 may at most depend on the record of list. Thus, there is no way to make the shadow records of obj and obj2 the same, something that the system 104 achieves easily with the approach of weak hashtables 300.

Static Analysis. Challenge C4—Instrumentation overhead may be high. Taint tracking requires every instruction to be instrumented, which can be very costly. The system uses static analysis to prune code paths that can be proven to not carry sensitive information. Thus, only a fraction of code is actually instrumented.

Prior to code instrumentation, the system 104 can optionally perform a global dataflow analysis on the entire application to find paths that may possibly leak private information. Any paths that are not found by the static analysis to be involved in private information leakage cannot leak at runtime and thus do not need instrumentation. In this way, the system 104 can minimize the instrumentation overhead.

Any framework that allows for global data flow analysis could be used. Soot and WALA are such frameworks for Java but they cannot analyze Dalvik bytecode. In order to find relevant code paths, the system 104 computes a forward program slice starting from the sources and a backward program slice starting from the sinks. A forward slice includes all instructions that are dependent on the seed instructions, e.g., the sources. Similarly, a backward slice includes all the instructions on which the seeds, e.g., the sinks depend. The relevant code paths are then an intersection of the forward and backward slices, also called a chop. Static analysis cannot soundly handle dynamic aspects of Java such as reflection and dynamic code loading. On the other hand, the analysis is able to soundly track other complicated features such as multithreading as described below.

The system 104 begins by performing a class hierarchy analysis to discover inheritance relationships among classes. This information is used to discover callbacks as well as in later stages of static analysis. Android applications have multiple entry points and discovering all of them is not trivial. The system 104 can use an algorithm, e.g., CHEX by Long Lu et al. to discover these entry points. The system then perform an Andersen-style flow-insensitive pointer analysis with on-the-fly call graph generation. Note that flow-sensitivity, apart from being expensive, is unsound for multi-threaded applications without adequate modeling of concurrency. In Android, multi-threading is usually not handled in the application code; therefore, flow-insensitivity is even advantageous. The analyses are based on a static single assignment (SSA) form of the IR, which allows us to recover flow-sensitivity through local variables. The pointer analysis is flexible and supports different notions of context sensitivity such as object-sensitivity and context-insensitive. The distinction between objects (also called heap sensitivity) is made based on their allocation sites, determined as the tuple (method, lineNo). The final stage computes slices. The system uses hybrid thin slices. Being based on the pointer analysis performed earlier, these slices are flow-sensitive over local variables but are flow-insensitive for flow through heap.

Figure 5:
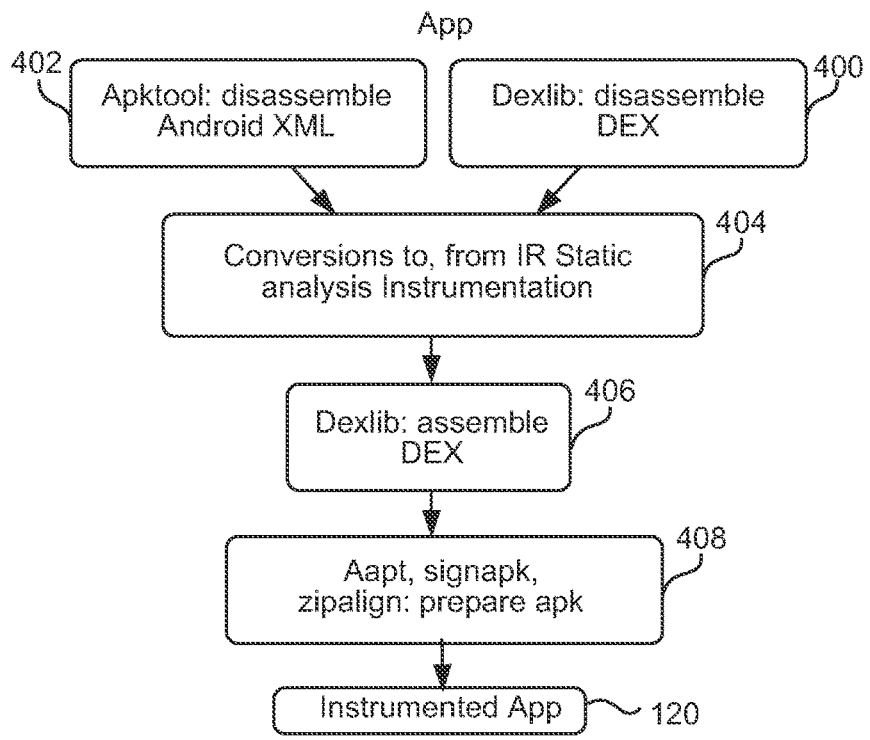
FIG. 5 is a flowchart of an example logic for detecting privacy leakage.

FIG. 5 is a flowchart of an example logic for detecting privacy leakage. While the implementation is directed toward the problem of detecting privacy leakage, it may be used for enforcing other security policies based on API interposition or information flow. The system uses a library called dexlib to disassemble and assemble Dalvik bytecode (400). The disassembled representation is converted to an intermediate representation (IR). In addition, the system can also use Android apktool (http://code.google.com/p/android-apktool/) to disassemble the binary Android XML format for discovering entry points for static analysis and other systems from the Android SDK and elsewhere to prepare an instrumented application (402).

In the example, an IR very close to the bytecode is used that does not require decompilation to either Java bytecode or the source code as some previous works have required. Since decompilation is not always successful, this approach improves the robustness of the system 104. Disregarding details like register widths, the Dalvik bytecode instructions generally have a direct correspondence with the instructions in the IR. Similar instructions (such as all binary operations or all kinds of field accesses) are represented as variants of the same IR instruction. Range instructions (invoke-*/range and filled-new-array-*/range) access a variable number of registers; these are converted to the representations of invoke-* and filled-new-array-* instructions with a variable number of register arguments in the IR (404). The IR design is suitable for both static analysis and instrumentation. For static analysis, the system further converts the IR to an SSA version. The results of the static analysis then guide the instrumentation module 108. The instrumented IR is then assembled back to Dalvik bytecode (406). The framework is implemented for extensibility. For example, SSA-based optimizations can be implemented such as constant propagation and dead code elimination in the future to further optimize the instrumented code. A deployed system for detecting information leakage tracks taints through inter-process communication and files (408).

Most of the instrumentation and static analysis code is written in Scala, with about a hundred lines of Python code. The taint-tracking data structures and related code is written in Java. The instrumentation adds a compiled version of this code to every application for runtime execution. The total the system codebase sizes to about 9,000 lines of code. Note that Scala allows for writing terse code; the equivalent Java or C++ code is usually two to three times as long.

Figure 6:
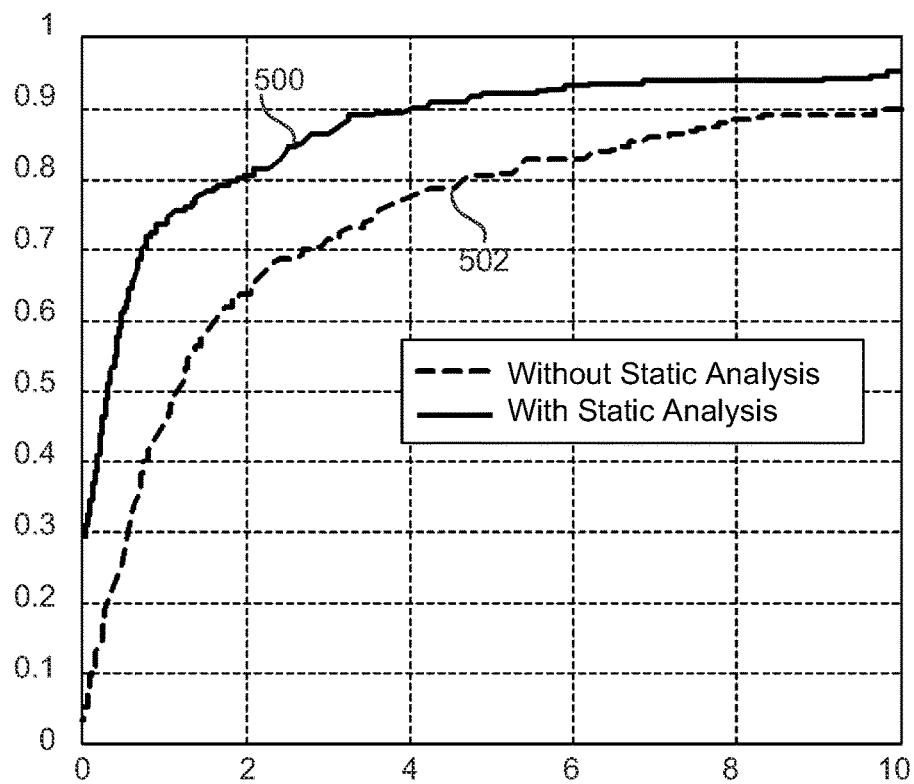
FIG. 6 is a graph illustrating example runtime performance with static analysis and without static analysis.

FIG. 6 is a graph illustrating example runtime performance with static analysis and without static analysis. Runtime performance of applications instrumented by the system 104 can be measure. Micro-benchmarking each instruction may not give the correct picture; micro-benchmarking suites do not access private information and thus static analysis may mark the all the code as clean. Moreover, designing a micro-benchmarking experiment in which effects of JIT compilation on instrumented benchmark code do not result in significant deviation from real workloads is also difficult (for example, the JIT compiler may optimize away most of the instrumentation done on a particular micro-benchmark). Performance can be evaluated by measuring the time in which an application entry-point completes execution. Entry point methods can be instrumented beginning with "on" (such as "onCreate" and "onClick") to report this information. In Android, such entry point methods can be associated with application responsiveness. Since entry points lead to all the executable code in an application, differences in their running times (including any methods called directly or indirectly from them) can be representative of the runtime overhead. The measurement strategy involves browsing through the application, which triggers these entry points. The time in which an entry-point completes execution is logged. Finally, the system 104 uses the mean of these logs to compare with another version (instrumented/not instrumented) of the application.

The application user interface (UI) is fuzzed for both the instrumented and the original versions of the applications and then calculations are made as described above. FIG. 6 depicts example percentage overhead of instrumented applications over original applications with (500) and without (502) doing any static analysis. Note that even without static analysis, the median overhead is about 117%. Although apparently a big number, in the experience, most instrumented applications that are manually checked have fair responsiveness. As is illustrated from FIG. 6, the overhead for applications instrumented with static analysis is much lower than applications instrumented without static analysis. The median overhead here is about 17% while the third quartile comes at about 61%, showing that static analysis can be quite effective at reducing overheads. Note that for a small number of applications, the overheads are extremely high or even negative; these results may be attributed to the randomness in testing; runs of different application versions may have followed different paths, or possibly triggered different code.

Note that even though the instrumentation is heavyweight, the performance overhead is still low; part of the reason for this is that at runtime, the Android middleware does substantial work on behalf of the application. With the middleware not instrumented at all, the system 104 balance out some of the overhead there.

Figure 7:
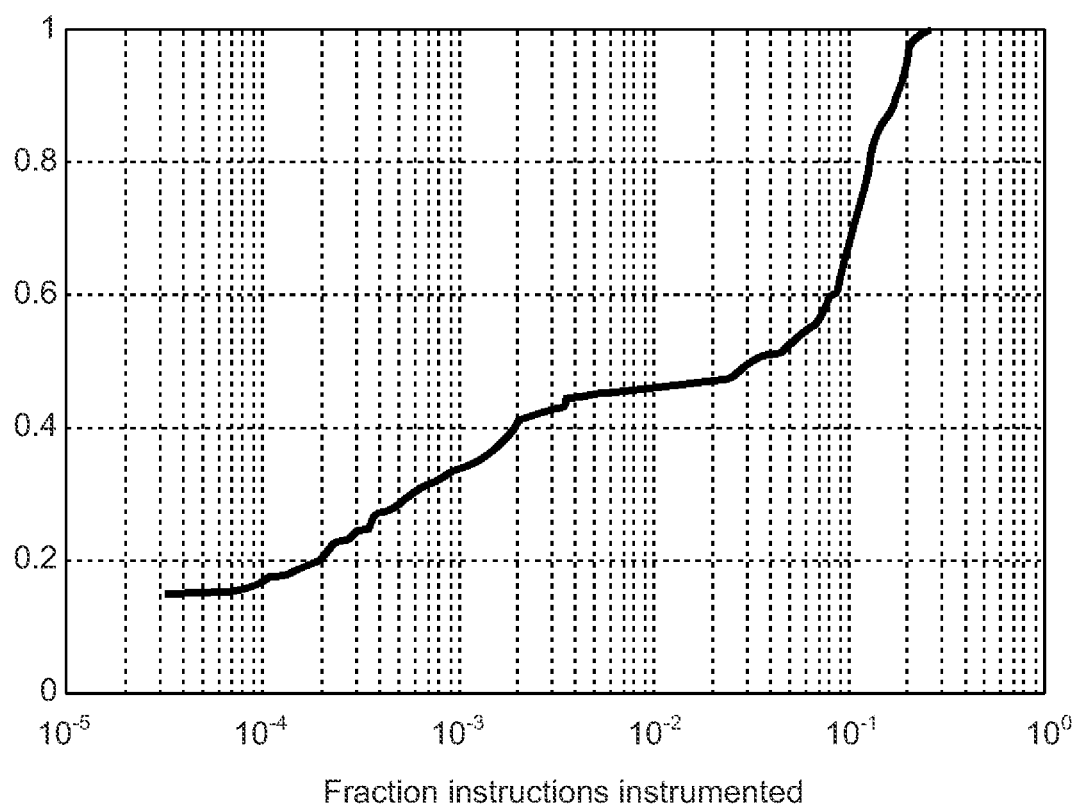
FIG. 7 is a graph of an example CDF for fraction of instructions instrumented (x-axis log scale).

FIG. 7 is a graph of an example CDF for fraction of instructions instrumented (x-axis log scale). FIG. 7 depicts the fraction of instructions instrumented after static analysis. For about 17% of applications, static analysis did not find any leaking paths resulting in zero instrumentation. For many others, it can be required to instrument only a few instructions, usually one or two digit figures for applications containing thousands or tens of thousands of instructions. The maximum fraction of instructions instrumented is about 26%. The system 104 also measured the time to instrument each application. The instrumentation completes in an average of about 37 seconds when static data flow analysis is not being performed. With static analysis, about half the applications complete within four minutes. The rest take longer. The performance of static analysis may be improved by using more sophisticated and more finely tuned implementations.

Dynamic aspects of Java. As a limitation of the instrumentation assisted by static analysis, the dynamic aspects of JVM, such as reflection and dynamic class loading (using DexClassLoader or similar features in Android) do not cleanly fit in. These may however be supported in this approach. Worst-case tainting may be applied for all method calls made by reflection as for other methods. Furthermore, the system 104 can instrument calls by reflection and alert the UI if they do not pass certain security policies (such as restricting reflective calls to only certain API in the Android platform). Code loaded by dynamic class loading may also not be available to static analysis. The system 104 may prompt the device 100 to allow reanalysis whenever dynamic code loading is detected so that an instrumented version of the code being loaded can be created.

Applications may include logic to determine if their code has been modified and refuse to run in the case of modification. Android applications are digitally signed and a typical way they may do this is by checking the signature on the application package; an instrumented applications cannot have the same signature as the original. An exemplary study on top 100 free applications on Google Play was conducted by disassembling and removing the original signature and then assembling and adding the own signature. Only one application (com.handcent.nextsms) out of one hundred resists application modification. This application makes signature checks at several points in the code, calling into a native code library for doing the checks, and exits immediately at a mismatch. Application markets, such as Google Play or enterprise application stores, may enforce that developers do not make such checks. One legitimate use of such checks is to prevent application piracy, and markets can provide alternative techniques for this problem.

Privacy leakage detection and mitigation. As discussed earlier, privacy leakage detection may be performed by real-time dynamic analysis, by offline dynamic analysis, and by static analysis. As discussed earlier, there are disadvantages of static analysis over real-time dynamic analysis. Finally, AppIntent is a offline-analysis system using symbolic execution for understanding if a privacy leak in an Android application is user-intended. The real-time analysis approach is complementary, allowing the user herself to make judgments if a privacy leak of intended.

Other dynamic taint analysis works. Dynamic taint analysis has been employed in a variety of applications from vulnerability detection and preventing software attacks and malware analysis to preventing privacy exposures. Dynamic taint analysis together with its applications and the details that may be needed to implement it. A general technique for taint tracking is presented without modifying the Android platform. The technique may be used for the above applications, especially when there is a constraint to run applications on an unmodified platform.

The system and framework can detect privacy leakages in Android applications in real-time without modifying the Android platform. To achieve this, the system statically instruments Android applications. It includes a static analysis component to reduce the code that needs instrumentation and provides run-time data structures and algorithm for private data tracking. An exemplary design and implementation of the system show that the system has good accuracy and incurs acceptable performance overhead.

The systems, methods, devices, and logic described above may be implemented in many different ways in many different combinations of hardware, software or both hardware and software. In one example, the systems and methods can be implemented with a processor and a memory, where the memory stores instructions, which when executed by the processor, causes the processor to perform the systems and methods. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it can be apparent that many more embodiments and implementations are possible. Accordingly, the embodiments are not to be restricted.

The invention claimed is:

1. A taint-tracking system using a taint-storage data-structure, the taint-tracking system comprising:
   a hashtable configured to operate in multi-threaded applications, a taint stored in the hashtable;
   a key of the hashtable including a weak reference to objects so that taint-storage does not interfere with garbage collection of an underlying runtime;
   values of the hashtable comprising records containing the taint and a set of objects that may point to containing objects referred to by the key; and
   an instrumentation module comprising a processor and memory, configured to handle taint propagation through framework code using a policy based application programming interface summarization, combined with storing relationships of containing objects so that changes in taints in an object may trigger taint changes in containing objects in keeping with the policy, where the instrumentation module is static to prune code paths that are proven to not carry sensitive information and to instrument only paths along which privacy leakage may happen, and the framework code is not modified, and where the instrumentation module is configured to dynamically track a flow of privacy-sensitive information along the path.

2. The taint-tracking system of claim 1, where the taint changes are handled recursively.

3. The taint-tracking system of claim 1, configured to handle taint effects of callbacks, by propagating a return taint of the callback to a receiver object taint.

4. The taint-tracking system of claim 1, where the objects comprise Java objects.

5. The taint-tracking system of claim 1, where the instrumentation module is configured to permit tracking of privacy-sensitive information related to policy enforcement without modification of a middleware of the operating system and a process virtual machine, where the privacy-sensitive information comprises device identifiers from application programming interfaces.

6. The taint-tracking system of claim 5, where the operating system comprises Android and the operating system middleware comprises Android middleware.

7. The taint-tracking system of claim 5, where the instrumentation module is configured to instrument operating system applications to detect access of, and leakage of, privacy data, and further prevent such access and leakage.

8. The taint-tracking system of claim 5, where the instrumentation module comprises a plug-in module.

9. The taint-tracking system of claim 8, where the plug-in module comprises a transformation module.

10. The taint-tracking system of claim 9, where the transformation module converts an original application to an instrumented application.

11. The taint-tracking system of claim 10, further comprising a hashtable to track taints coming from the instrumented application.

12. The taint-tracking system of claim 5, where the process virtual machine comprises a Dalvik virtual machine.

* * * * *